United States Patent [19]
Greenbaum et al.

[11] Patent Number: 6,077,315
[45] Date of Patent: Jun. 20, 2000

[54] COMPILING SYSTEM AND METHOD FOR PARTIALLY RECONFIGURABLE COMPUTING

[75] Inventors: Jack E. Greenbaum, Saratoga; Michael A. Baxter, Sunnyvale, both of Calif.

[73] Assignee: Ricoh Company Ltd., Tokyo, Japan

[21] Appl. No.: 09/005,218

[22] Filed: Jan. 9, 1998

Related U.S. Application Data

[63] Continuation-in-part of application No. 08/827,619, Apr. 9, 1997, Pat. No. 5,933,642, which is a continuation-in-part of application No. 08/423,560, Apr. 17, 1995, Pat. No. 5,794,062.

[51] Int. Cl.$^7$ .................................................. G07F 15/18
[52] U.S. Cl. .............................................................. 717/9
[58] Field of Search .................................. 395/709; 717/9

[56] References Cited

U.S. PATENT DOCUMENTS

| | | | |
|---|---|---|---|
| 5,050,065 | 9/1991 | Dartois et al. | 702/57 |
| 5,361,373 | 11/1994 | Gilson | 712/15 |
| 5,548,726 | 8/1996 | Pettus | 713/100 |
| 5,600,845 | 2/1997 | Gilson | 712/15 |
| 5,752,035 | 5/1998 | Trimberger | 717/5 |
| 5,794,062 | 8/1998 | Baxter | 712/30 |
| 5,802,290 | 9/1998 | Casselman | 709/201 |
| 5,822,565 | 10/1998 | Derosa, Jr. et al. | 713/100 |
| 5,898,872 | 4/1999 | Richley | 717/3 |
| 5,898,972 | 5/1999 | Rademacher | 15/341 |
| 5,966,534 | 10/1999 | Cooke et al. | 717/5 |

OTHER PUBLICATIONS

Hauser J. R., and Wawrzynek, J., "Garp: A MIPS Processor with a Reconfigurable Coprocessor," IEEE Symposium on FPGAs for Custom Computing Machines, IEEE Computer Society Press, pp. 12–21, 1997.

Iseli et al, A C++ compiler for FPGA costom execution units synthesis, 1995, pp.173–179.

Razdan et al., A High–Performance Microarchitecture with Hardware–Programmable Functional Units, 1994, pp.172–180.

*Primary Examiner*—Tariq R. Hafiz
*Attorney, Agent, or Firm*—Fenwick & West LLP

[57] ABSTRACT

A compiling system and method generates a sequence of program instructions for use in a partially reconfigurable processing unit, a portion of the processing unit having a hardware organization that is selectively reconfigurable during execution of the sequence of program instructions among a plurality of configurations, and a portion of the processing unit having a non-reconfigurable hardware organization, each configuration comprising a computational unit optimized for performing a class of computations. A compiler selectively compiles high-level source code statements for execution using configurations of the reconfigurable portion of the processing unit responsive to meta-syntax compiler directives. A linker creates object files that optionally encapsulate bitstreams specifying hardware organizations corresponding to the configurations.

30 Claims, 11 Drawing Sheets

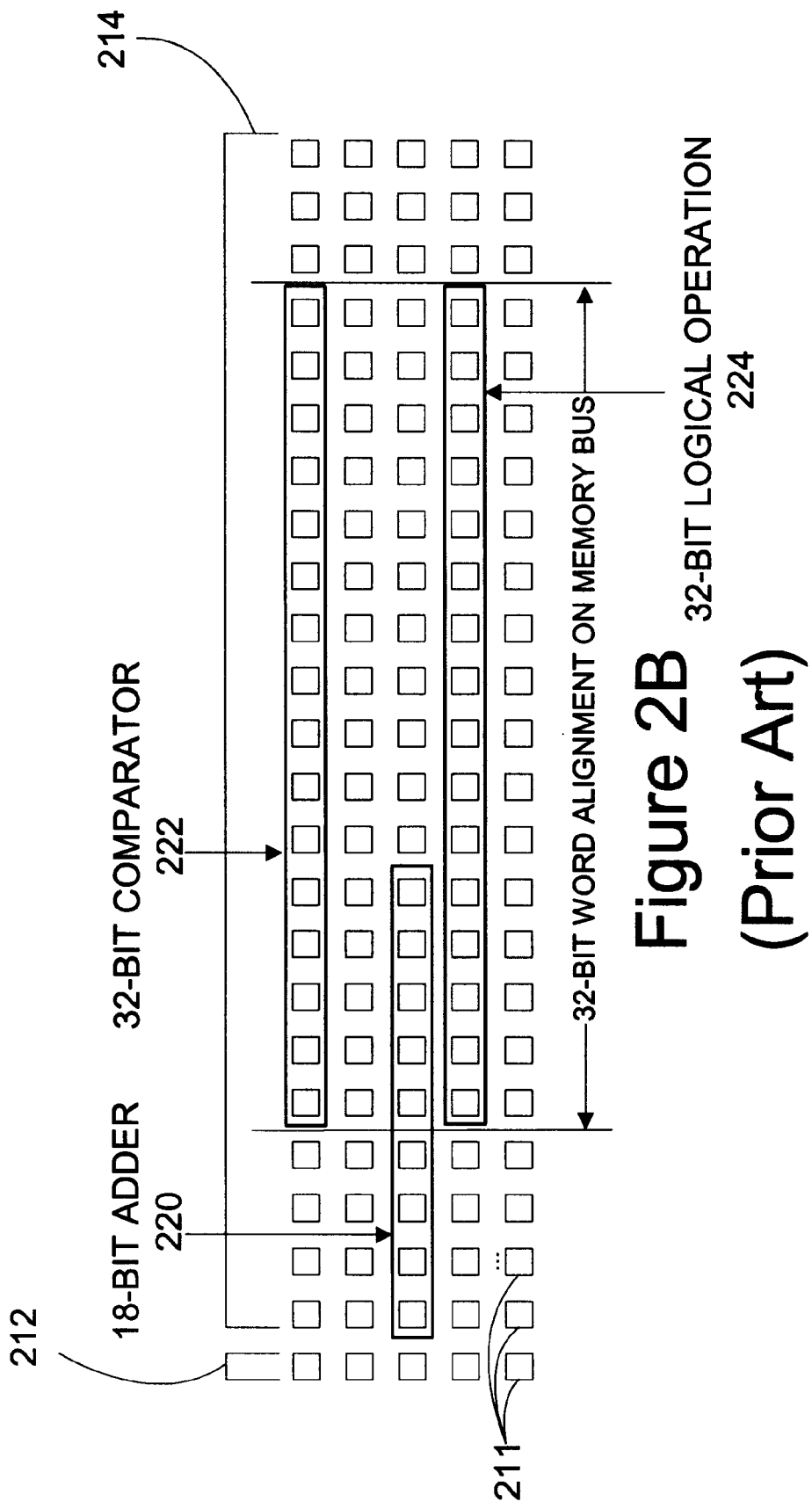
Figure 2B  32-BIT LOGICAL OPERATION (Prior Art)

COMPILING SYSTEM AND METHOD FOR PARTIALLY RECONFIGURABLE COMPUTING

CROSS-REFERENCE TO RELATED APPLICATIONS

The present invention is a continuation-in-part of U.S. patent application Ser. No. 08/827,619, entitled "Compiling System and Method for Reconfigurable Computing," filed on Apr. 9, 1997, now U.S. Pat. No. 5,933,642 which is a continuation-in-part of U.S. patent application Ser. No. 08/423,560, entitled "System and Method for Scalable, Parallel, Dynamically Reconfigurable Computing," filed on Apr. 17, 1995, now U.S. Pat. No. 5,794,062.

BACKGROUND OF THE INVENTION

1. Field of the Invention

The present invention relates generally to software for reconfigurable computers, and more particularly to a compiling system and method for generating executable files for use by a partially reconfigurable processing unit having a dynamically reconfigurable portion and a non-reconfigurable portion.

2. Description of Background Art

Reconfigurable Computing

Related Application Ser. No. 08/423,560, entitled "System and Method for Scalable, Parallel, Dynamically Reconfigurable Computing," describes a software-programmed reconfigurable computing architecture employing field-programmable gate arrays (FPGAs). The architecture is scalable, flexible, and fully reconfigurable. During execution of instructions, the reconfigurable processor executes a number of reconfiguration directives, which instruct the processor to dynamically reconfigure its hardware organization to implement a specified instruction set architecture (ISA). An ISA is a primitive set of instructions that can be used to program a computer.

Related Application Ser. No. 08/827,619, entitled "Compiling System and Method for Reconfigurable Computing," describes a compiler for compiling source code written in a high-level language like C or Pascal into executable files for use in a fully reconfigurable processing unit. Moreover, it describes (1) a source-level declarative specification for selection of the reconfigurable architecture, (2) a multi-ISA code generator, (3) a technique for preserving the thread of control during hardware reconfiguration, and (4) a method for linking FPGA bitstreams into a separate section of the executable.

Partially Reconfigurable Computing

Recently, proposals have been made for a partially reconfigurable computing system including a standard microprocessor having some dynamically reconfigurable logic resources. These resources are used to implement special instructions that speed execution of particular programs. One such approach is disclosed by R. Razdan and M. D. Smith in "A High-Performance Microarchitecture with Hardware-Programmable Functional Units," *Proceedings of the Twenty-Seventh Annual Microprogramming Workshop*, IEEE Computer Society Press, 1994. The system includes a central processing unit (CPU) with a portion of the silicon die used to implement an FPGA. The CPU has a fixed data path to which the FPGA is connected.

Radzan also discloses a software environment for programming the hybrid FPGA/CPU processing unit. Specifically, an assembler is disclosed that accepts, as input, an assembly language program and outputs a new assembly language program in which particular sequences of instructions are automatically combined into single new assembly language instructions to be executed by the reconfigurable portion of the processor. Thus, Radzan automatically creates new ISAs at the time of assembly.

The software environment of Radzan, however, has a number of disadvantages. For example, the automatic ISA generation feature is limited to a narrow range of applications. No efficient method for automatically generating ISAs is demonstrated. Indeed, because such generation is an NP-hard problem, an efficient algorithm may not be possible. Additionally, because ISA generation is automatic, the programmer has only a coarse control over the code generated. Thus, the resulting code is likely to be less efficient than comparable code written by a programmer. Finally, the automatic ISA generation feature requires a highly complex assembler, which is more susceptible to unanticipated problems. What is needed, then, is an efficient compiler for compiling high-level source code into executable files for use by a partially reconfigurable processing unit having a dynamically reconfigurable portion and a non-reconfigurable portion.

Another hybrid sytem known as "Garp" is disclosed by John R. Hauser and John Wawrzynek in "Garp: A MIPS Processor with a Reconfigurable Coprocessor," *IEEE Symposium on FPGAs for Custom Computing Machines*, IEEE Computer Society Press, 1997. Garp includes a conventional MIPS processor and an FPGA slave computational unit located on the same die as the processor. Garp is designed to fit into an ordinary processing environment— one that includes structured programs, libraries, context switches, virtual memory, and multiple users. Moreover, in Garp, the main thread of control is managed by the non-reconfigurable MIPS processor, although for certain loops or subroutines, the program will switch temporarily to the reconfigurable FPGA to obtain an increase in execution speed.

Garp also provides software tools for writing programs that take advantage of the hybrid architecture. Specifically, it provides a configurator module for accepting a human-readable description of an FPGA configuration and producing therefrom a bitstream that can be hosted by the FPGA. Once created, the bitstream may be linked into an ordinary C program. However, like Radzan's system, the Garp compiler does not compile high-level language statements into assembly code for execution by the reconfigurable portion of the processor.

In addition, the Garp software environment has a number of other drawbacks. For example, since the FPGA configuration can only be invoked using a set of new Garp-specific instructions that are unknown to a standard compiler, the programmer must expressly provide assembly code to interface with to the FPGA. In particular, as presently disclosed, there is no means for automatically generating assembly code to load a configuration, perform register allocation, execute the configuration, and read a return value from the FPGA. Moreover, Garp's software environment has no means for determining the configuration currently in context within the FPGA. The compiler cannot, therefore, selectively generate code to reconfigure the FPGA depending on whether the target configuration is already loaded. Finally, as disclosed, the Garp programming environment expects that bitstreams are defined as character arrays in C, which are loaded by the linker into a standard data segment. This approach, however, does not provide any control over how the bitstream will be aligned in memory. A standard linker might, for example, load the bitstream at a byte rather than a word boundary, resulting in a misaligned bitstream. Many FPGAs will not function unless the bitstream is properly aligned within a multi-byte word.

What is needed, then, is a system and method for programming a partially reconfigurable processing unit such as the Garp processor using a high-level language without having to resort to assembly language in order to interface with the reconfigurable portion of the processor. Additionally, what is needed is a source-level declarative specification for a Garp program that can be used by a compiler to generate assembly code. Moreover, what is needed is a compiler that can selectively provide assembly code to reconfigure the FPGA depending on whether the target configuration is already loaded. In addition, what is needed is a system that allows bitstreams to be placed in a special section of the object file, allowing the linker to segregate bitstreams from other data for purposes of alignment and/or storing the bitstreams in privileged memory. In addition, what is needed is a method and apparatus for encapsulating binary machine instructions and data along with the hardware configurations required to execute the machine instructions.

SUMMARY OF THE INVENTION

The present invention overcomes the disadvantages of the prior art by providing a system and method for compiling high-level source code into executable files for use in a partially reconfigurable processing unit having a dynamically reconfigurable portion and a non-reconfigurable portion. In one aspect of the invention, a compiling method includes accepting as input a source file containing a plurality of source code instruction statements including at least a first subset of instruction statements and a second subset of instruction statements; identifying a first configuration of the selectively reconfigurable portion of the processing unit to be used in executing the first subset of instruction statements; identifying a second configuration of the selectively reconfigurable portion of the processing unit to be used in executing the second subset of instruction statements; and compiling the first subset of instruction statements for execution using the first configuration and compiling the second subset of instruction statements for execution using the second configuration.

In another aspect of the invention, a compiling system and method provides a source-level declarative specification that can used by a compiler to generate assembly code for a partially reconfigurable processing unit. In yet another aspect of the invention, a compiler selectively generates code to reconfigure the processing unit depending on whether the target configuration is already resident in the reconfigurable portion of the processing unit. In still another aspect of the invention, bitstreams are placed in a special section of the object file, allowing a linker to segregate bitstreams from other data for purposes of alignment and/or storing the bitstreams in privileged memory. In another aspect of the invention, a compiling system and method includes encapsulating binary machine instructions and data along with the hardware configurations required to execute the machine instructions.

BRIEF DESCRIPTION OF THE DRAWINGS

FIG. 2B is an illustration of the layout of multi-bit functions within the reconfigurable array in accordance with the prior art.

DETAILED DESCRIPTION OF THE PREFERRED EMBODIMENTS

System Architecture

Figure 1:
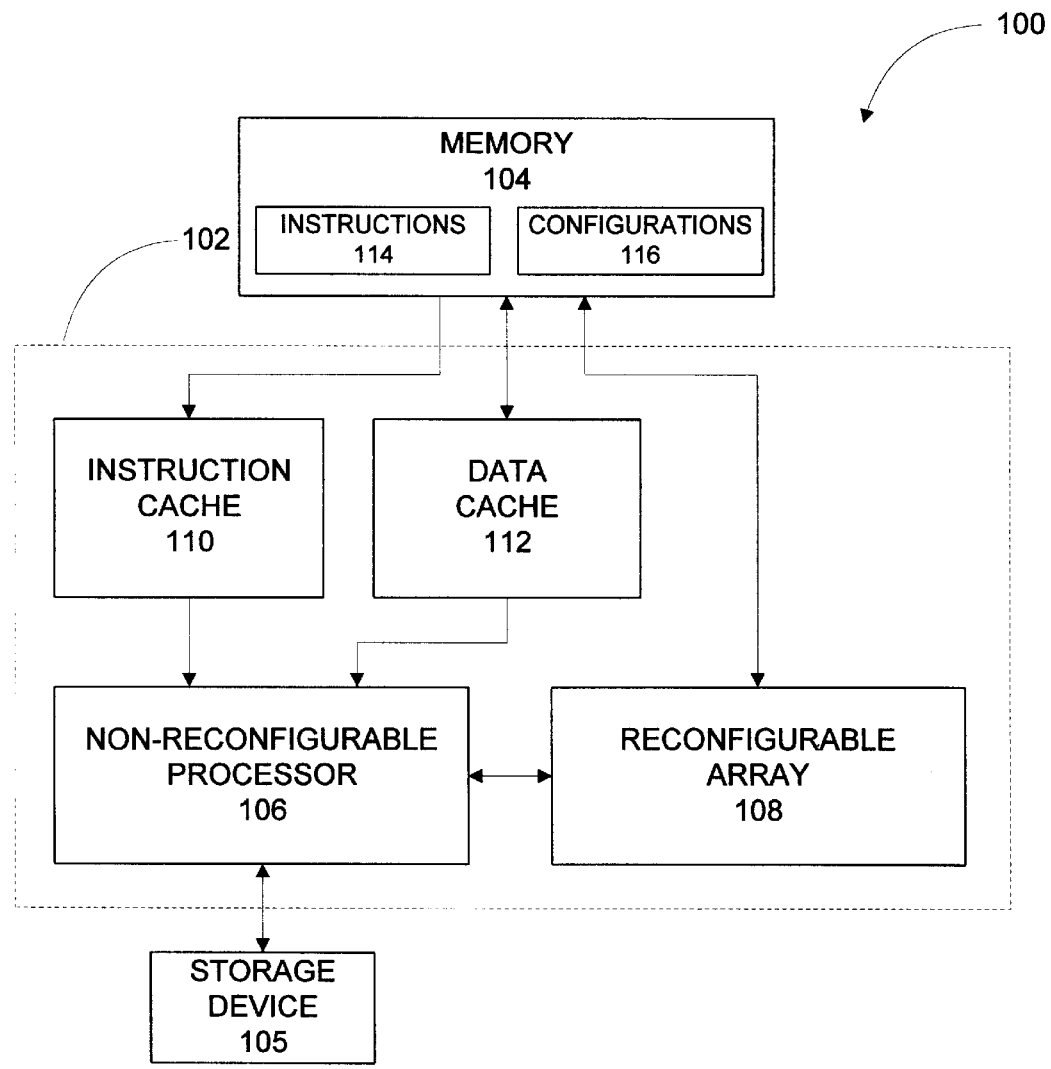
FIG. 1 is a block diagram of the hardware components of a partially reconfigurable computing architecture in accordance with the prior art.

Referring now to FIG. 1, there is shown a block diagram of a partially reconfigurable computer 100 for executing object files generated in accordance with the present invention. In a preferred embodiment, computer 100 conforms to the Garp architecture as described by John R. Hauser and John Wawrzynek in "Garp: A MIPS Processor with a Reconfigurable Coprocessor," *IEEE Symposium on FPGAs for Custom Computing Machines*, IEEE Computer Society Press, 1997, the subject matter of which is incorporated herein by reference. However, one skilled in the art will recognize that a variety of other partially reconfigurable architectures could be used within the scope of the present invention, such as the NAPA1000 Adaptive Processor designed by National Semiconductor Corporation.

Computer 100 preferably comprises a partially reconfigurable processing unit 102, a memory 104, and a storage device 105. Memory 104 is a standard memory device and contains a store of instructions 114 and configurations 116. Storage device 105 is a standard storage device such as a hard drive, CD-ROM, flash memory, or other suitable storage device.

In a preferred embodiment, processing unit 102 includes a non-reconfigurable processor 106, a reconfigurable array 108, an instruction cache 110, and a data cache 112. Non-reconfigurable processor 106 is preferably a conventional microprocessor implementing the MIPS-II instruction set, a well-known ISA. However, processor 106 has been altered using techniques known in the art to execute a number of Garp-specific instructions, as will be described in more detail hereafter. Reconfigurable array 108 is preferably a reconfigurable logic device similar to the Xilinx 4000 series field-programmable gate array, although one skilled in the art will recognize that array 108 has been specially designed according to the Garp architecture to interface with, and reside on the same die as, processor 106. Instruction and data caches 110, 112 are also preferably located on the same die as processor 106 and reconfigurable array 108, and are implemented using conventional cache memory circuitry.

Figure 2:
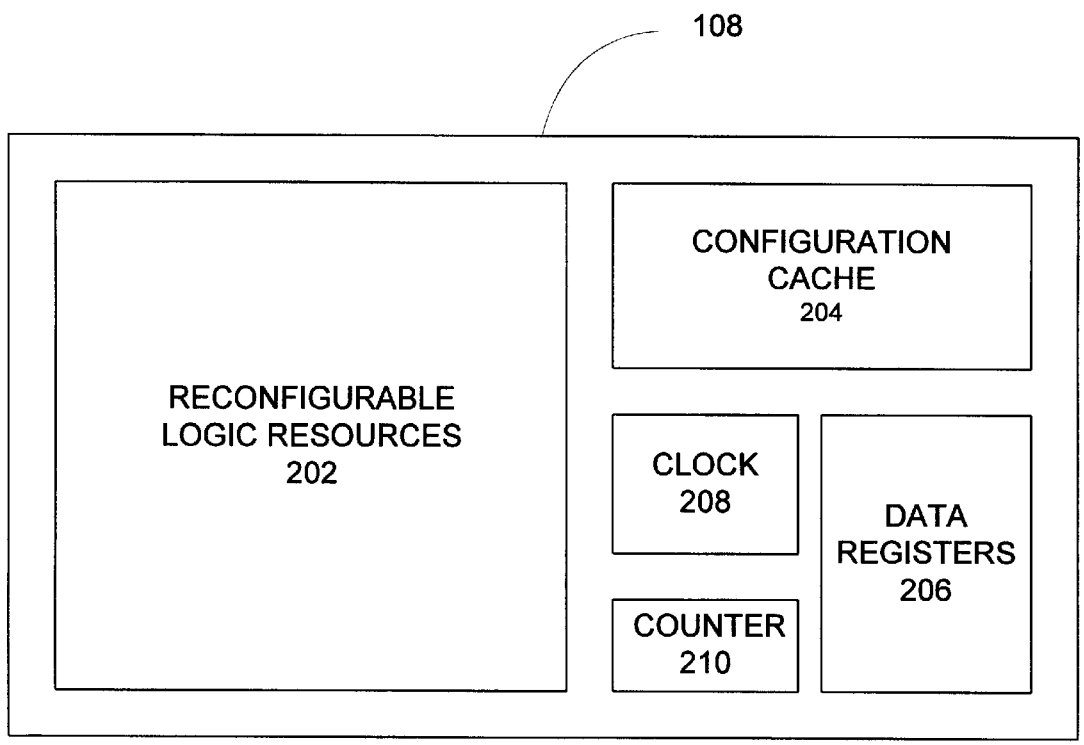
FIG. 2 is a block diagram of a reconfigurable array in accordance with the prior art.

Referring now to FIG. 2, there is shown a block diagram of the reconfigurable array 108. Like a conventional FPGA, array 108 comprises reconfigurable logic resources 202. Array 108 also includes a configuration cache 204, data registers 206, a clock 208, and a clock counter 210.

Figure 2A:
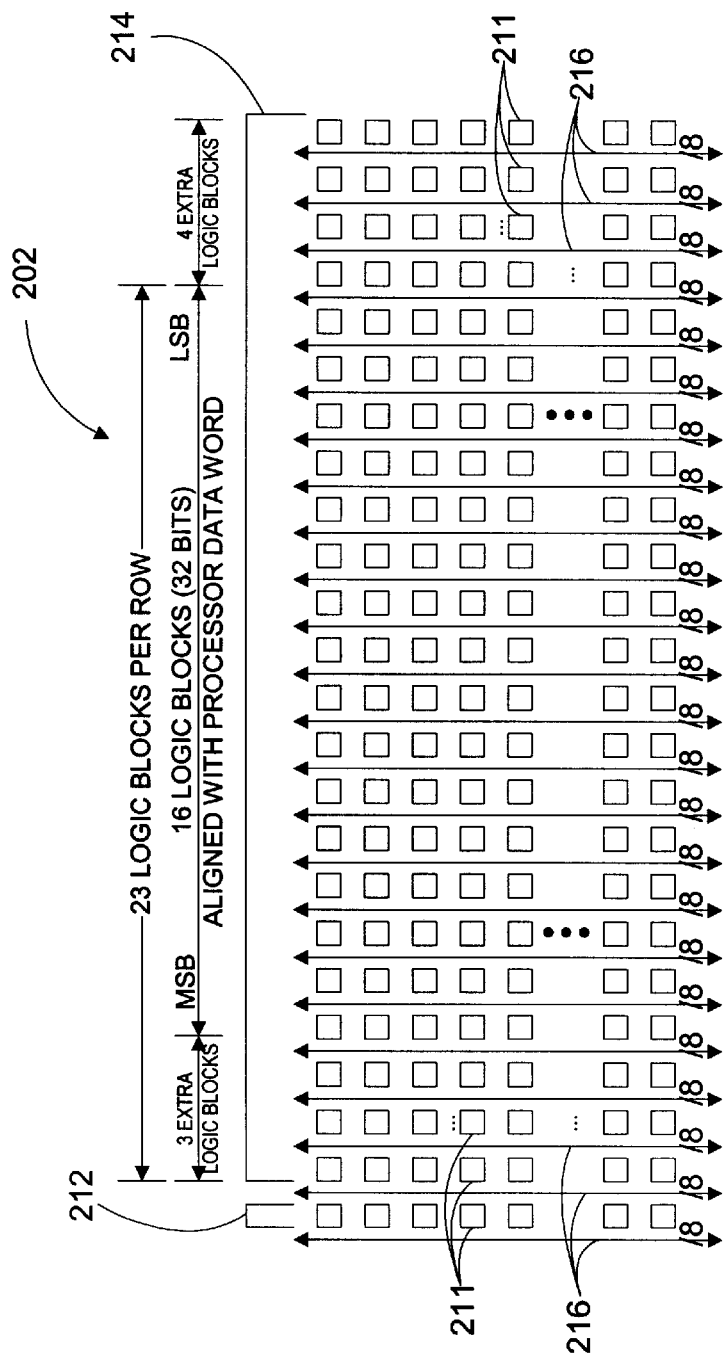
FIG. 2A is an illustration of the reconfigurable array organization in accordance with the prior art.

Referring now to FIG. 2A, there is shown a diagram of the organization of array 108. Reconfigurable logic resources 202 comprise a plurality of blocks 211. One block 211 on each row of array 108 is used as a control block 212. The remainder of the blocks 211 are used as logic blocks 214, which correspond roughly to the configurable logic blocks (CLBs) of the Xilinx 4000 series FPGA. The Garp architecture fixes the number of columns of blocks 211 at 24. The number of rows is implementation-specific, but is usually at least 32. The precise configuration of array 108, however, is not crucial to the invention.

The basic quantum of data within array 108 is 2 bits. Logic blocks 214 operate on values as 2-bit units, and all wires are arranged in pairs to transmit 2-bit quantities. Operations on 32-bit quantities thus generally require 16 logic blocks 214. With 23 logic blocks 214 per row, there is space on each row for an operation of 32 bits, plus a few blocks to the left and right for overflow checking, rounding, control functions, wider data sizes, or the like.

Four memory buses 216 run vertically through the rows for moving information into and out of the array 108. During array 108 execution, memory buses 216 are used for data transfers to and from memory 104 and/or the non-reconfigurable processor 106. For memory 104 accesses, transfers are restricted to the central portion of each memory bus 216, corresponding to the middle 16 logic blocks 214 of each row. For loading configurations 116 and for saving and restoring array 108 state, the entire width of memory buses 216 is used.

Memory buses 216 are not available for moving data between blocks 211. Instead, a more conventional wire network (not shown) provides interconnection within array 108. Wires of various lengths run orthogonally vertically and horizontally. Vertical wires can be used to communicate between blocks 211 in the same column, while horizontal wires can connect blocks 211 in the same or adjacent rows. Unlike most FPGA designs, there are no connections from one wire to another except through a logic block 214. However, every logic block 214 includes resources for potentially making one wire-to-wire connection independent of its other obligations.

Referring also to FIG. 2, distributed within array 108 is a configuration cache 204. Cache 204 is used to cache recently used FPGA configurations 116, allowing programs to quickly switch between several configurations 116 without the cost of reloading them from memory 104 each time. As with traditional memory caches, the size and management of configuration cache 204 is transparent to programs.

Array 108 also includes data registers 206 that are latched according to an array clock 208. The frequency of array clock 208 is fixed by the implementation. Although no necessary relationship exists between the array clock and timing of processor 106, the two will normally be in synchronicity. A clock counter 210 governs array 108 execution. While the clock counter 210 is nonzero, the state of array 108 is updated and clock counter 210 is decremented with each array clock 208 cycle. When clock counter 210 is zero, updates of state in array 108 are stalled, effectively stopping execution of array 108. Thus, non-reconfigurable processor 106 sets the clock counter 210 to nonzero to make array 108 execute for a specified number of cycles.

Control blocks 212 at the end of every row serve as liaisons between array 108 and the other components of processing unit 102 and memory 104. For example, control blocks 212 can interrupt non-reconfigurable processor 106 and can initiate memory 104 accesses to and from array 108.

Logic blocks 214 in array 108 can implement a function of up to four 2-bit inputs. As shown in FIG. 2B, operation on data wider than 2 bits can be formed by adjoining logic blocks 212 along a row. For example, FIG. 2B illustrates a typical layout of multi-bit functions, including a 32-bit comparator 220, an 18-bit adder 222, and a 32-bit logical bitwise operation 224.

Processor Control of Array Execution

As noted above, non-reconfigurable processor 106 executes a number of Garp-specific instructions for controlling array 108 in addition to the conventional MIPS-II instruction set. One skilled in the art will recognize how processor 106 may be augmented with these instructions during the design process. The most important of the instructions are included below in Table 1.

TABLE 1

| Instruction | Interlock? | Description |
| --- | --- | --- |
| gaconf reg | yes | Load (or switch to) configuration at address given by reg. |
| mtga reg, array-reg, count | yes | Copy reg value to array-reg and set array clock counter to count. |
| mfga reg, array-reg, count | yes | Copy array-reg to reg and set array clock counter to count. |
| gabump reg | no | Increase array clock counter by value in reg. |
| gastop reg | no | Copy array clock counter to reg and zero clock counter. |
| gacinv reg | no | Invalidate cache copy of configuration at address given by reg. |
| cfga reg, array-control-reg | no | Copy value of array-control-register to reg. |
| gasave reg | yes | Save all array data state to memory at address given by reg. |
| garestore reg | yes | Restore previously saved data state from memory at address in reg |

As illustrated above, instructions are provided for loading configurations 116 into array 108, for copying data between array 108 and the processor 106, for setting clock counter 210, and for saving and restoring array 108 state on context switches.

To avoid restricting the implementation of processor 106, the Garp architecture does not specify how many processor 106 instructions might execute during an array clock 208 cycle. Instead, to keep processor 106 and array 108 synchronized, certain Garp-specific instructions wait for clock counter 210 to reach zero before performing their function. The "interlock?" column of Table 1 indicates whether the specified instruction waits for counter 210 to run down to zero.

Array Reconfiguration

Figure 3:
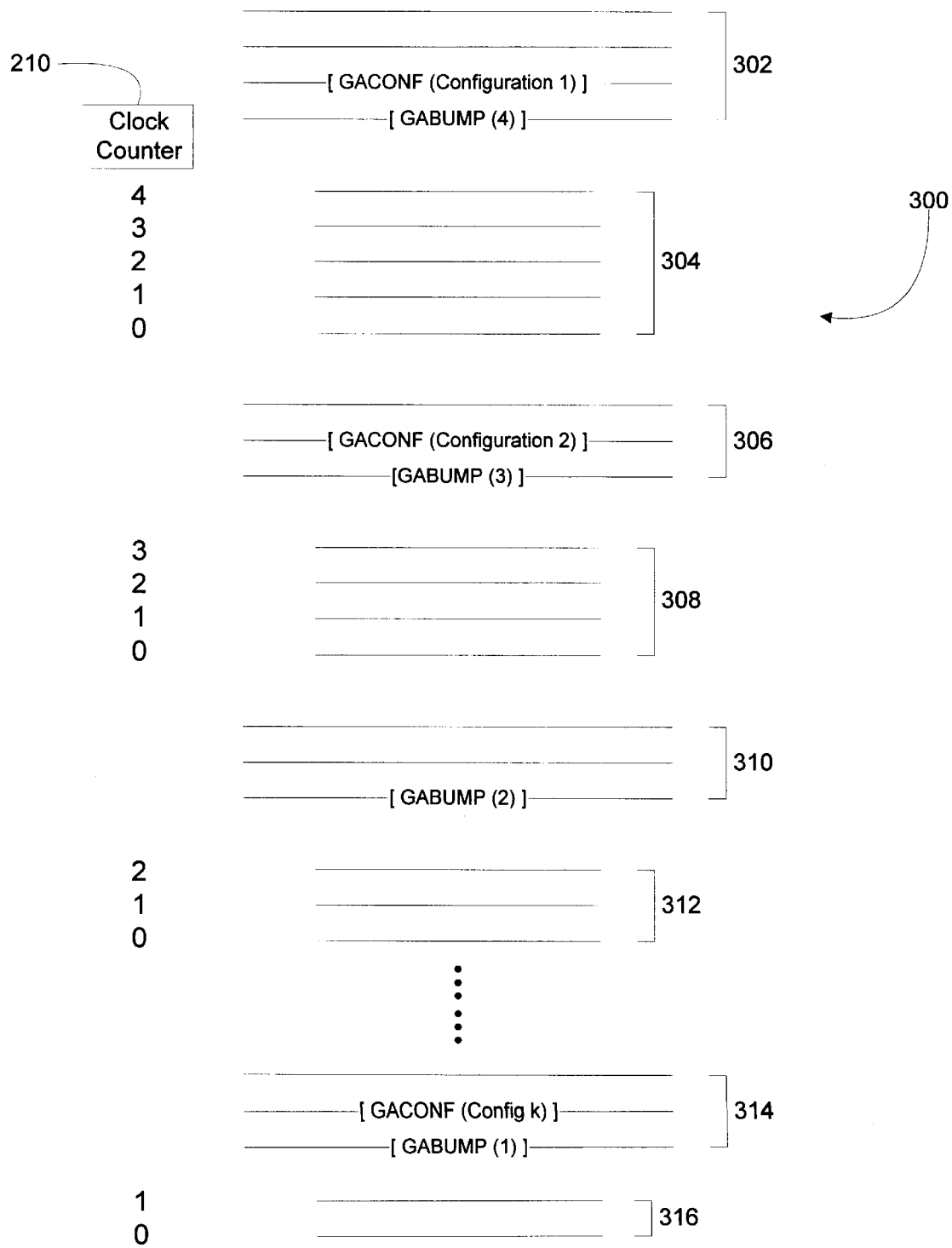
FIG. 3 is an exemplary program listing in accordance with the present invention.

Memory 104 preferably includes an instruction store 114 comprising machine language instructions selectively including reconfiguration directives. The Garp architecture defines an instruction called gaconf for reconfiguring array 108 to a specified configuration 116, also stored in memory 104. Referring now to FIG. 3, there is shown an exemplary program listing 300 including program portions 302, 306, 310, 314, and array clock cycles 304, 308, 312, and 316. Portions 302, 306, 310, and 314 preferably include instructions belonging the MIPS-II instruction set, selectively including such additional Garp-specific instructions as shown in Table 1.

In exemplary program listing 300, a first reconfiguration directive appears in program portion 302, instructing processor 106 to load a configuration 116 called Configuration 1 into array 108. Thereafter, the gabump command is executed, setting clock counter 210 to 4, at which time array 108 cycles under control of clock 208 until counter 210 reaches zero. A similar result occurs in program portions 306, 308, 314, and 316.

As illustrated in portion 310, however, a new configuration 116 is not loaded. As will be detailed hereafter, one of the features and benefits of the present invention is that the compiler will not generate code for loading a configuration 116 if that configuration is already resident in array 108. In the present example, the desired configuration was already resident in array 108 because it was loaded in program portion 306. As a result, the reconfiguration code was not generated.

Compiling System Components

Figure 4:
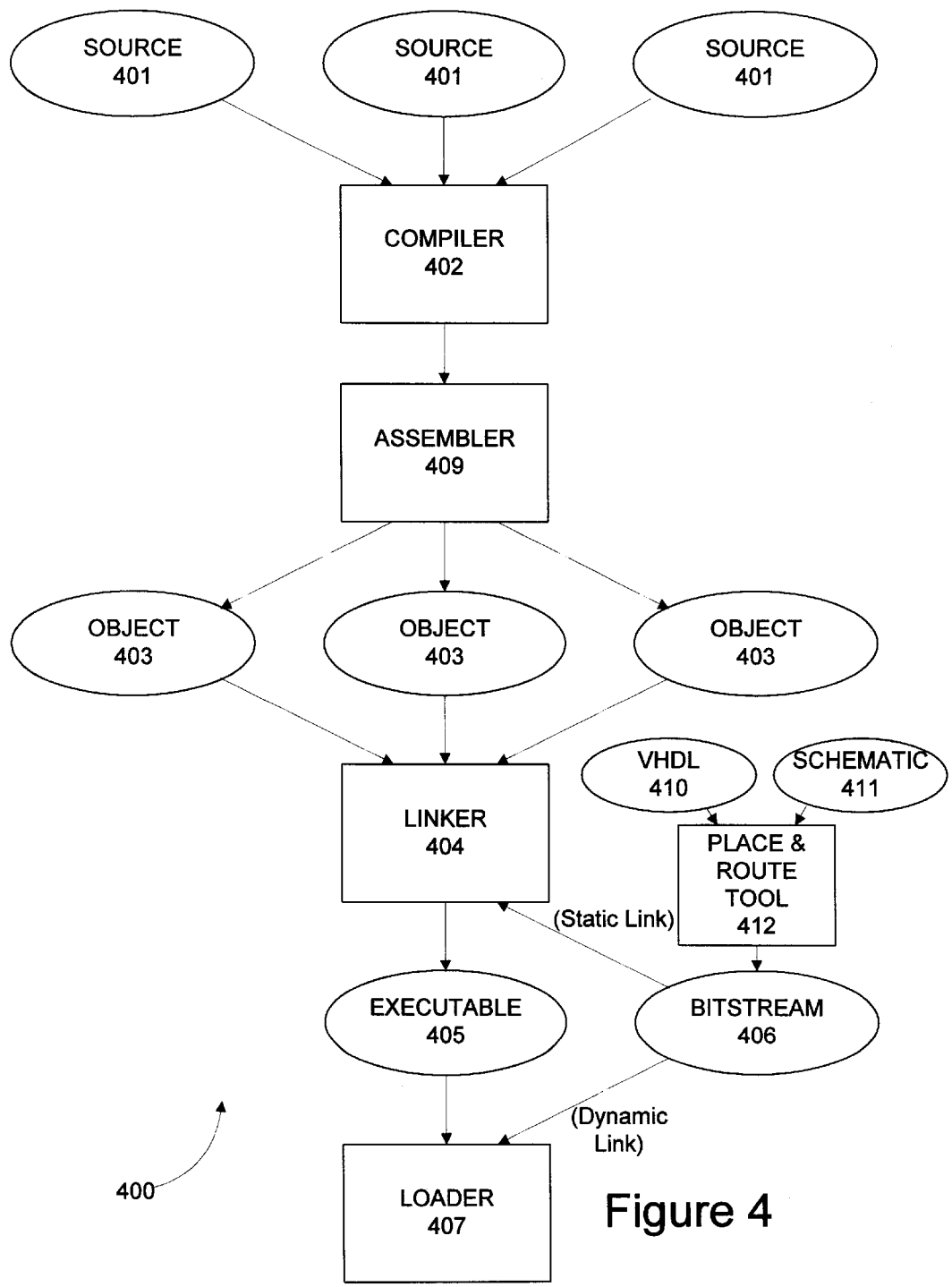
FIG. 4 is a block diagram of a compiling system in accordance with the present invention.
Figure 5:
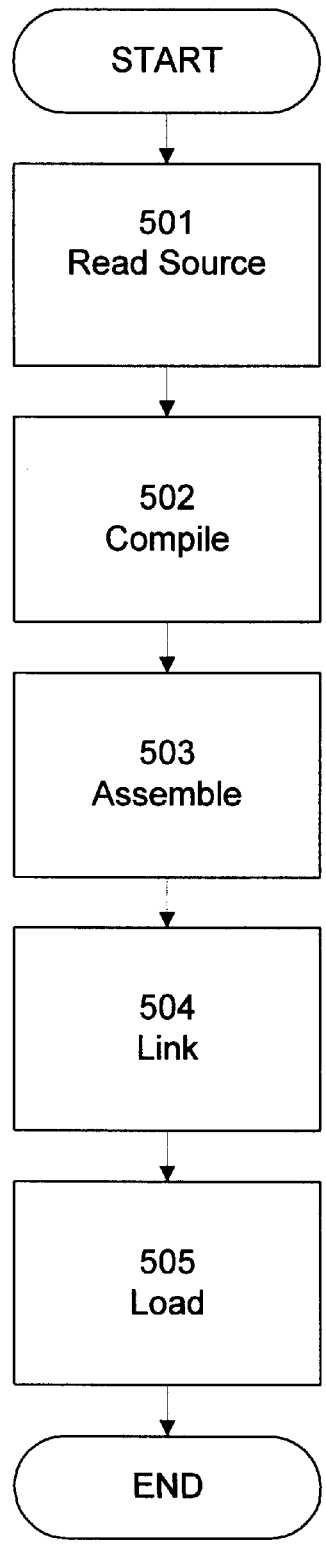
FIG. 5 is a flowchart of an overall compiling method for partially reconfigurable computing in accordance with the present invention.

Those skilled in the art will recognize that the inclusion of reconfiguration directives in a sequence of program instructions requires a specially modified compiler to account for the different syntax. Referring now to FIG. 4, there is shown a block diagram of a compiling system 400 in accordance with the present invention. In a preferred embodiment, the system and method of the present invention runs natively on the partially reconfigurable computer 100. However, one skilled in the art will recognize that a typical workstation or personal computer could also be used to compile programs. In that case, the object files produced therefrom would be loaded into reconfigurable computer 100 after compilation via a network interface (not shown) or by another conventional means. Referring also to FIG. 5, there is shown a flowchart of an overall compiling, assembling, linking, and loading method according to the present invention. Further details of the compilation step of FIG. 5 are provided below in connection with FIGS. 6A–C.

Source files 401 are compiled with a specially-modified C compiler 402, described below. Compiler 402 reads 501 source files 401 containing source code instruction statements from storage device 105 or from some other input or storage device. Compiler 402 then compiles 502 the source files 401 into assembly language statements. As will be detailed hereafter, compiler 402 may identify a number of reconfiguration directives, directing processor 106 to reconfigure array 108 to the specified configuration 116. In that case, compiler 402 will generate appropriate instructions for handling the reconfiguration. As will be described below, configuration 116 is defined by a bitstream 406 that is hosted by array 108. Thus, bitstream 406 defines the hardware organization of array 108.

When the end of the source file 401 is reached, the assembly language statements are assembled 503 by assembler 409 to create object files 403. Object files 403 are then linked 504 using a software linker 404, which has been modified to handle bitstream 406 locations, to create an executable 405. As described below, a statically-linked executable 405 contains bitstreams 406. After executable 405 is created by linker 404, it is loaded 505 into memory 104 by loader 407. In the case of a dynamic link, bitstream 406 is also loaded from a library into memory 104 by loader 407.

Bitstreams

One skilled in the art will recognize that bitstreams 406 for specifying a hardware organization of array 108 may be created using a variety of techniques. For example, the Garp software environment provides a configurator module (not shown) for accepting a human-readable description of an FPGA configuration 116 and producing therefrom a bitstream 406 that can be hosted by the FPGA. Once created, the configuration 116 may be linked into an ordinary C program.

In a preferred embodiment, configurations 116 of array 108 are designed using a hardware definition language such as VHDL 410 or using conventional schematics 411, both of which are well known to those skilled in the art of hardware design. The design is then processed by a place & route tool 412, such as XACT, manufactured by Xilinx Corp. of San Jose, Calif. Place & route tool 412 then converts the design into a bitstream 406 for loading into array 108.

Meta-Syntax Directives

In a preferred embodiment, reconfiguration directives are preceded by #pragma, a standard meta-syntax provided by the C language to pass information to the compiler that falls outside the language syntax. The use of the #pragma syntax permits the reconfiguration directive to operate in the context of a C program. An example of a reconfiguration directive found in source code would be:

pragma func_isa add3 config_add3

In one embodiment, three #pragma directives are provided. Each directive operates at a distinct level of granularity, or scope, and thereby affects a specific piece of code:

reconfig: effects an immediate reconfiguration (scope is any arbitrary block of code);

func_isa: specifies a configuration for a particular function (scope is the function); and default_func_isa: specifies a default configuration (scope is the entire file).

These reconfiguration directives result in Register Transfer Level (RTL) reconfiguration statements that provide the compiler with information for determining which configuration is needed for each block of code, as will be discussed in more detail below.

In a preferred embodiment, a related directive is also provided called ga_regs, which maps abstract variables in the high-level language of source 401 to array registers 208. The operation of this directive will be illustrated below. The following is a code example of the meta-syntax directives according to the present invention.

```
1   #pragma default_func_isa default
2
3   #pragma func_isa add3 config_add3
4   int
5   add3 (int a0, int a1, int a2)
6   {
7       int z0;
8       #pragma ga_regs a0, a1, a2, z0
9
10      return a0 + a1 + a2;
11  }
12
13  main ( )
14  {
15      int z = 0;
16
```

```
17       z = add3 (1, 2, 3);
18
19  #pragma reconfig new
20       {
21                z += 1;
22                printf("c", z);
23       }
24  }
```

Line 1 of the code listing is an example of the default_func_isa directive, specifying the configuration 116 called default is to be used for any functions that do not specify another configuration. The scope of this directive is the entire file; therefore, the directive applies to the entire listing as shown.

Line 3 of the code listing is an example of the func_isa directive, specifying that the configuration 116 called config_add3 is to be used by array 108 within the function add3. The scope of this directive is the specified function.

Line 8 of the code listing is an example of the ga_regs directive, which maps program variables to array registers 208. In a preferred embodiment, the compiler will map variables A0, A1, and A2 to processor 106 registers. In order for reconfigurable array 108 to add the registers, the values contained therein must be copied into data registers 206 corresponding to inputs as defined by bitstream 406. The ga_regs directive helps compiler 402 determine which variables should be mapped to array registers 208. If a variable within the scope of the function does not have a corresponding ga_regs directive, it will not be mapped to a register 206.

Line 19 of the code listing is an example of the reconfig directive, specifying that a configuration 116 called new is to be used in the code block immediately following the directive. The scope of this directive is the code block shown in lines 20 to 23 of the code listing.

Compiling Method

Figure 6A:
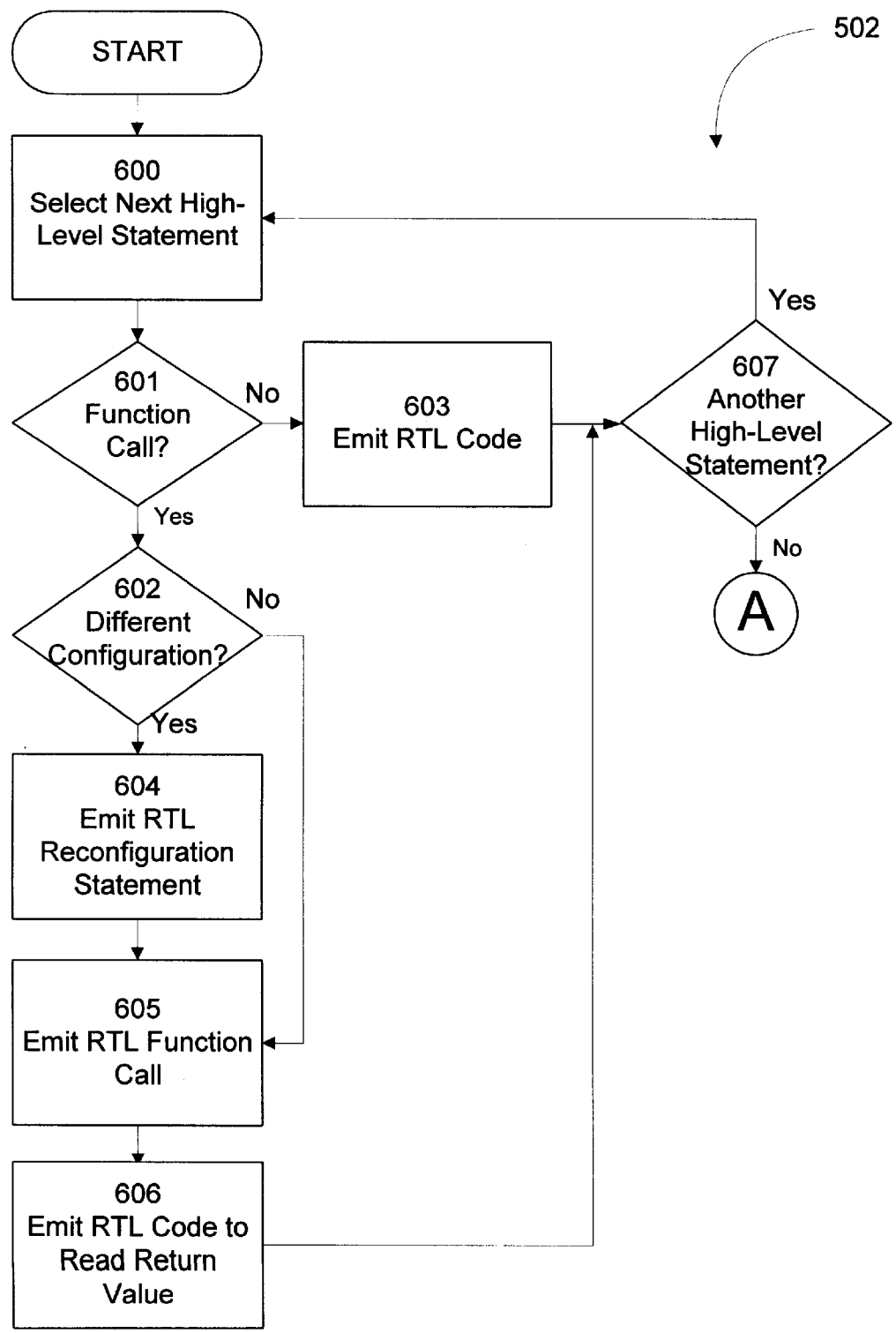
FIG. 6A is a flowchart of preferred compiling operations of a compiler front-end in accordance with the present invention.
Figure 6B:
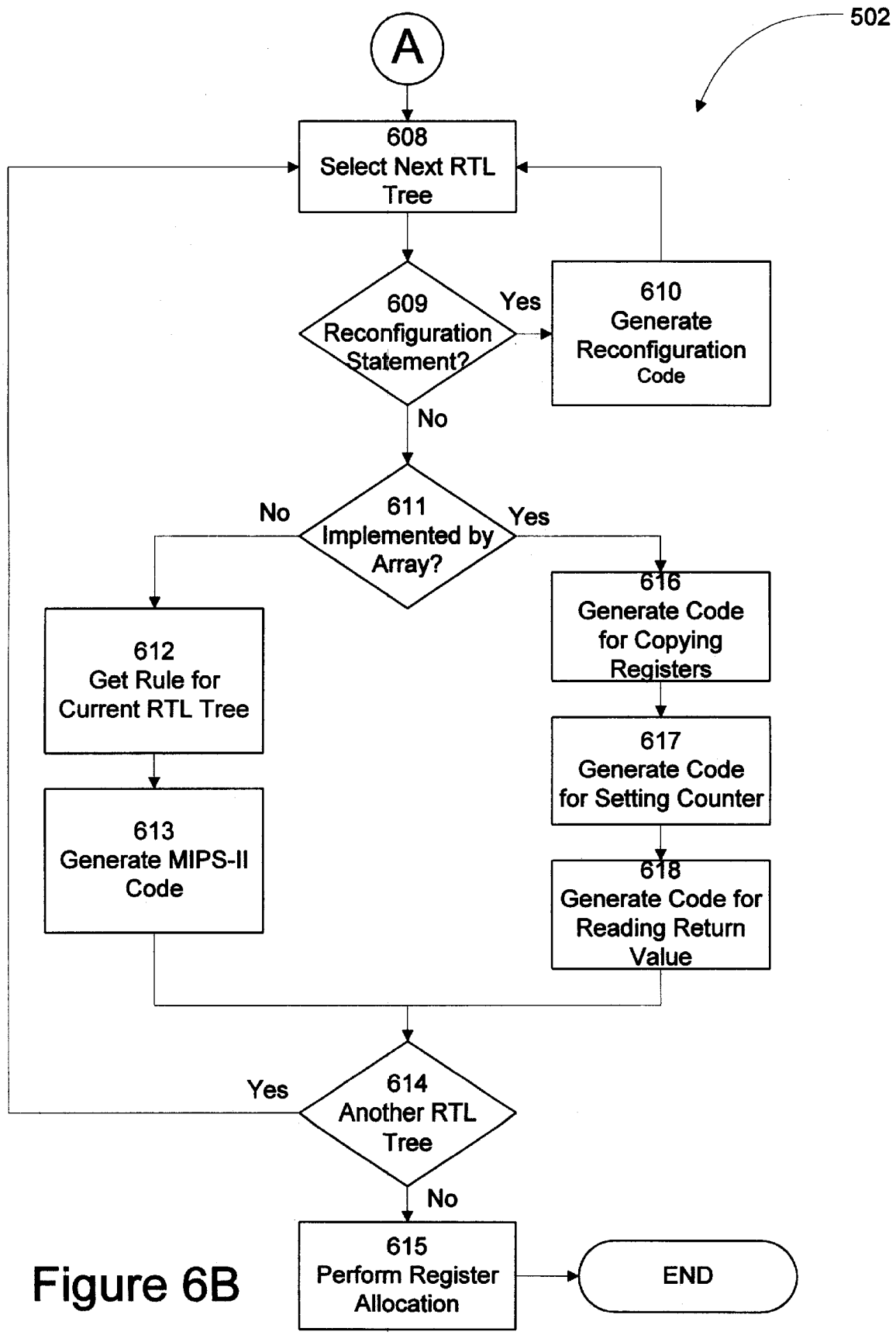
FIG. 6B is a flowchart of preferred compiling operations of a compiler back-end in accordance with the present invention.

Referring now to FIGS. 6A and 6B, there is shown a flowchart of a preferred compiling method according to the present invention. FIG. 6A illustrates steps performed by the compiler front-end, while FIG. 6B depicts steps performed by the compiler back-end. The front-end interprets meta-syntax directives and generates Register Transfer Level (RTL) statements which may be interpreted in a conventional manner by the back-end. As is well known in the art, RTL statements are ISA-independent intermediate-level statements used in conventional compilers such as the GNU C compiler (GCC) produced by the Free Software Foundation (Cambridge, Mass.). RTL may be extended, according to the Stanford University Intermediate Format (SUIF) specification, as disclosed in Stanford SUIF Compiler Group, *SUIF: A Parallelizing & Optimizing Research Compiler*, Tech. Rep. CSL-TR-94-620, Computer Systems Lab, Stanford University, May 1994. For example, the source code statement:

$x=y+3;$ might be represented in RTL as follows:

$r1<-y$ $r0<-r1+3$ $x<-r0$

The method of FIGS. 6A and 6B takes, as its input, source file 401 containing a sequence of high-level source code instruction statements and also containing at least one reconfiguration directive specifying a configuration 116 for array 108. For illustrative purposes, a structured reconfiguration environment is assumed, wherein reconfiguration occurs at a function-by-function level using the func_isa meta-syntax directive. The compiler 402 front-end selects 600 a next high-level statement from source file 401, and determines 601 whether the selected high-level statement represents a function call. If the selected statement is not a function call, compiler 402 emits 603 RTL code for the statement.

If in 601 compiler 402 determines that the statement is a function call, compiler 402 determines 602 whether the function requires a different configuration 116 than the one currently in context. If a different configuration is not required, compiler 402 emits 605 RTL code for the function call and for reading 606 the return value of the function. If a different configuration is required, such as when a #pragma directive is found specifying a new configuration 116, compiler 402 emits 604 an RTL reconfiguration statement. In a preferred embodiment, the RTL reconfiguration statement is a non-standard RTL statement that identifies the configuration 116. As above, compiler 402 then emits 605 RTL code for the function call and for reading 605 the return value of the function.

Upon completion of either 603 or 606, compiler 402 determines 607 whether another high-level statement remains in source 401. If so, compiler 402 returns to 600; otherwise it proceeds to 608.

Referring now to FIG. 6B, the back-end of compiler 402 performs steps 608 through 614 to translate previously-generated RTL statements into assembly language. Compiler 402 selects 608 a next RTL tree. One skilled in the art will recognize that RTL statements may be grouped together by compiler 402 into tree-like hierarchies to represent the underlying functionality of the code. For example, to find the sum of four numbers stored in registers, an RTL tree might be represented by the following pseudocode:

(add a3,(add a2,(add a1, a0)))

After selecting the next RTL tree, compiler 402 then determines 609 whether the RTL tree comprises a reconfiguration statement. If so, then compiler 402 generates 610 reconfiguration assembly code for reconfiguring array 108 to the specified configuration. In a preferred embodiment, this is accomplished by means of the gaconf instruction.

Figure 6C:
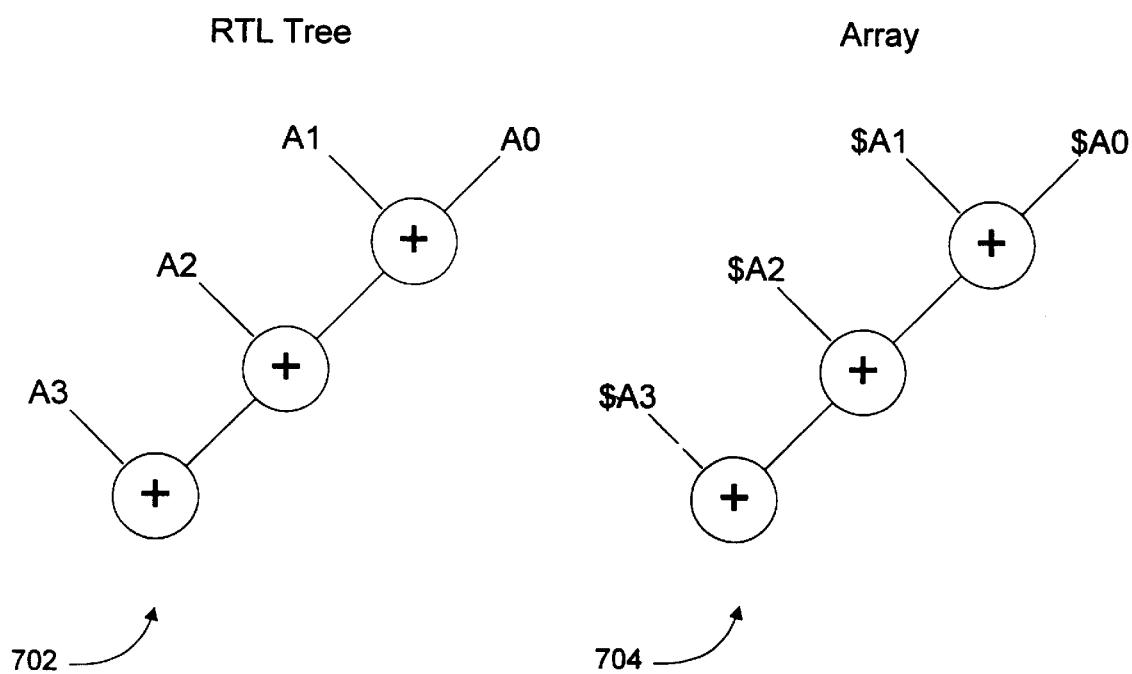
FIG. 6C is an illustration of data flow graphs for a register transfer level tree and reconfigurable array according to the present invention.

If in 609 the RTL tree does not comprise a reconfiguration statement, compiler 402 determines 611 whether the functionality of the tree may be implemented by the current configuration 116 of array 108. This determination may be done a number of ways. For example, as illustrated in FIG. 6C, compiler 402 preferably builds data flow graphs 702, 704 (DFGs) corresponding to the RTL tree and the current configuration 116 of array 108, respectively. Compiler 402 then attempts to match DFGs 702, 704 using standard tree-matching techniques that are well known to those of skill in the art.

The following code segment is illustrative of this process.

```
1    #pragma func_isa add4 config_add4
2    int
3    add4 (int a0, int a1, int a2, int a3)
4    {
5         #pragma ga_regs a0, a1, a2, a3
6
7         return a0 + a1 + a2 + a4;
8    }
```

As noted above, the statement "a0+a1+a2+a4" is represented in pseudo-code by the RTL tree "(add a3, (add a2, (add a0,a1)))." Assuming that the configuration config_add4 provides a hardware organization that adds four numbers, FIG. 6C illustrates the corresponding DFGs 702, 704. One skilled in the art will recognize that loops and other more complex C-language structures may be similarly matched using the foregoing technique.

If in 611 the RTL tree is not found to be implemented by array 108, compiler 402 gets 612 a rule specifying a manner in which the current RTL tree can be translated into assembly code for non-reconfigurable processor 106. In a preferred embodiment, the target ISA for processor 106 is the MIPS-II instruction set. Compiler 402 then generates 613 a set of assembly language statements corresponding to the currently-considered RTL tree according to the rule. Compiler 402 then determines 614 whether another RTL tree requires consideration. If so, compiler 402 returns to 608. Otherwise, compiler 402 performs 615 conventional register allocation operations.

If in 611 the RTL tree is found to be implemented by array 108, compiler 402 generates 612 assembly code for interfacing with array 108. In a preferred embodiment, this is accomplished by generating assembly code for copying 616 processor 106 registers into array registers 206 (MTGA), setting 617 the clock counter 210 in order to start array 108 execution (GABUMP), and reading 618 a return value from array 108 (MFGA). One skilled in the art will also recognize that assembly code may be selectively generated for saving (GASAVE) and restoring (GARESTORE) registers 206.

For example, in a preferred embodiment, the above-listed code segment would be translated into assembly code as shown in Table 2.

TABLE 2

| | C-Language Statement | Asembly Instruction |
|---|---|---|
| 1 | #pragma func_isa add4 config_add4 | la v0, config_add4 |
| 2 | | gaconf v0 |
| 3 | int | |
| 4 | add4(int a0, int a1, int a2, int a3) | |
| 5 | { | |
| 6 | #pragma ga_regs a0, a1, a2, a3 | mtga a0, $a0 |
| 7 | | mtga a1, $a1 |
| 8 | | mtga a2, $a2 |
| 9 | | mtga a3, $a3, 2 |
| 10 | | |
| 11 | return a0 + a1 + a2 + a4; | mfga v0, $z1 |
| 12 | } | |

In the above example, the names a1, a1, a2, a3, and v0 refer to ordinary MIPS registers. In line 2, the la instruction is the MIPS "load address" instruction, and loads into register V0 the address in memory 104 of a bitstream 406 called config_add. Thereafter, in line 2, the gaconf instruction reconfigures array 108 according to bitstream 406. Lines 6–9 are generated by compiler 402 responsive to the ga_regs directive. The mtga instructions copy processor 106 registers into array registers 206. In line 9, one skilled in the art will recognize that the ", 2" argument is the equivalent of inserting a gabump 2 instruction. Either technique increases clock counter 210 by 2, starting array 108 execution Finally, in line 11, the mfga instruction copies the results of the processing by array 108 into a processor 106 register.

In accordance with the present invention, different C-language functions and constructs may result in similar or identical assembly language code. An example of this situation is illustrated below in Table 3.

TABLE 3

| | C-Language Statement | Asembly Instruction |
|---|---|---|
| 1 | #pragma func_isa myfunc config_myfunc | la v0, config_myfunc |
| 2 | | gaconf v0 |
| 3 | int | |
| 4 | myfunc (int a0, int a1, int a2, int a3) | |
| 5 | { | |
| 6 | #pragma ga_regs a0, a1, a2, a3 | mtga a0, $a0 |
| 7 | | mtga a1, $a1 |
| 8 | | mtga a2, $a2 |
| 9 | | mtga a3, $a3, 2 |
| 10 | | |
| 11 | return a0 − a1 * a2 / a4; | mfga v0, $z1 |
| 12 | } | |

As shown in the above example, the assembly code generated by compiler 402 for the function "a0−a1*a2/a4" is substantially identical to that produced for the function "a1+a2+a3+a4." The only difference between the two is the address of the bitstream 406.

Thus, compiler 402 selectively and automatically generates assembly language statements in accordance with multiple configurations during compilation operations. In other words, during the compilation process, compiler 402 compiles a single set of program instructions from source files 401, and selectively generates (1) assembly code for processor 106 or (2) reconfiguration instructions for interfacing with array 108. Compiler 402 is preferably a conventional compiler modified to perform the preferred compiling operations described above in connection with FIGS. 6A–C.

Referring again to FIG. 4, assembler 409 takes, as input, assembly language statements generated by compiler 402, and produces therefrom object files 403. Object files 403 are then linked by linker 404, which handles bitstream 406 locations to create an executable 405. Loader 407 concatenates like segments from a plurality of object files 403, including bitstream 406 segments, into a single memory image for loading into memory 104 of partially reconfigurable computer 100. In one embodiment, such concatenation is done at run-time; in an alternative embodiment, it is done off-line. It is advantageous if linker 404 is able to perform memory alignment on executable 405 to account for alignment requirements of the FPGA bitstream 406. Certain FPGA loading hardware requires bitstreams of constant size. Therefore, linker may perform memory alignment by padding bitstreams 406 in order to conform to the requirements of such hardware.

When static linking is used, bitstreams 406 and executables 405 are joined by linker 404 at link time. When dynamic linking is used, bitstreams 406 and executables 405 are joined at load time, so that executable 405 and bitstreams 406 are loaded into memory 104 by loader 407 running on reconfigurable computer 100.

In a preferred embodiment of the present invention, Garp includes a reconfiguration instruction, which causes array 108 to load a bitstream 406 referenced by an argument of the instruction. Thus, there is at least one relocation type related to relocating bitstream addresses used as an argument to the reconfiguration instructions. The relocation entry in the object file tells the linker to substitute the actual address of an entity into a segment of an executable at link time. Relocation types are described in more detail below.

As will be described below, bitstreams are defined as data objects which are located in a particular section, possibly read-only, and therefore standard relocation techniques are able to provide relocation of bitstream addresses used with reconfiguration instructions in an analogous way to any program-defined, read-only data.

Preservation of Program State

Unlike the fully reconfigurable systems disclosed in the related applications above, reconfiguration of array 108 does not result in loss of state information. Program state is maintained by non-reconfigurable processor 106. Consequently, the system and method of the present invention does not need to preserve program state during reconfiguration to avoid loss of the execution thread during such hardware transitions.

Executable and Linking Format

A preferred embodiment of the present invention extends standard software development paradigms to include bitstreams 406 defining hardware configurations for executing binary machine instructions from executable file 405. This is accomplished by using a new file format designated as Garp ELF, comprising an extension of the Executable and Linking Format (ELF) commonly used on Unix workstations and described in UNIX System Laboratories, Inc., *System V Application Binary Interface*,. 3d. ed., 1993, which is incorporated herein by reference.

Figure 7:
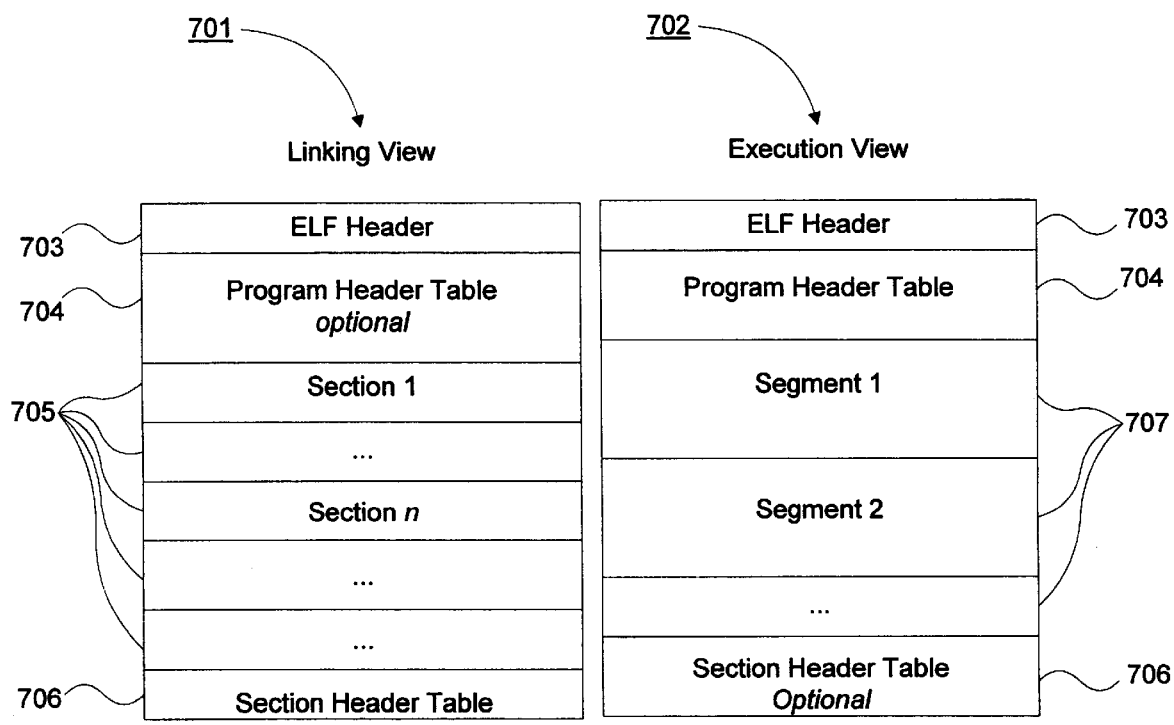
FIG. 7 is a diagram of an object file format according to the prior art.

As described in UNIX System Laboratories, Inc., *System V Application Binary Interface*, 3d. ed., 1993, ELF files are either relocatable files (object files 403) or executable files 405. ELF provides parallel views of the file's contents, reflecting differing needs of these two formats. Referring now to FIG. 7, there is shown a typical ELF file format in a linking view 701 and in an execution view 702 according to the prior art. ELF header 703 holds a "road map" describing the file's organization. Sections 705 hold the bulk of object file information for linking view 701, including instructions, data, symbol table, relocation information, and the like, as will be described in more detail below. Segments 707 used in execution view 702 are analogous to sections 705, with each segment 707 corresponding to one or more sections 705. In addition, segments 707 may include headers that contain information, such as whether the segment 707 is in writable memory, that may or may not be applicable to sections 705. In general, sections 705 contain information used during linking, while segments 707 contain information used during loading.

Program header table 704, if present, tells computer 10 how to build a process image. Section header table 706 contains information describing sections 705. Each section 705 has an entry in table 706; each entry gives information such as section name, size, and the like. Elements shown in FIG. 7 can be provided in any order, and some elements may be omitted.

Further details regarding the elements shown in FIG. 7 can be found in UNIX System Laboratories, Inc., *System V Application Binary Interface*, 3d. ed., 1993. The following description explains the differences between standard ELF as described in *System V Application Binary Interface* and the Garp ELF file format used in the present invention.

The Garp ELF file format uses processor-dependent features of ELF to provide relocation of bitstream 406 addresses used within program text, and to provide relocation and linking of bitstreams 406 into segments that can be loaded at run-time within memory 104. Garp ELF thus extends standard ELF to facilitate storage of bitstreams 406 defining array 108 configurations 116 along with the code to be executed using FPGA-defined hardware. Garp ELF adds to standard ELF by providing new sections and symbol types for bitstreams 406.

Sections. One embodiment of the present invention adds a new section containing FPGA bitstream data, with the name .Garp.bitstream. One or more such sections may be provided. In the preferred embodiment, each such section is of ELF section type SHT_PROGBITS and has ELF section attribute SHF_ALLOC. SHT_PROGBITS designates a section holding information defined by the program, whose format and meaning are determined solely by the program. Attribute SHF_ALLOC specifies that the section occupies memory during process execution, information that may be useful to the loader.

Since ELF allows multiple instances of a section with a particular name, the present invention can employ one section per bitstream 406, or alternatively it can merge all bitstreams 406 into one section with proper alignment.

It is advantageous to provide a new section so that hardware can be built with special memory areas for bitstreams 406. The separate section facilitates placement of bitstreams 406 in these special memory areas by loader 407. If such memory areas are not needed, the present invention can be implemented using a standard data section for program read-only data, such as .rodata and .rodata1, as described in *System V Application Binary Interface*, rather than introducing special bitstream 406 sections.

Symbols. Object files contain symbol tables holding information for locating and relocating a program's symbolic definitions and references. In one embodiment of the present invention, each bitstream contained in the .Garp.bitstream section has an entry in the symbol table of the object file. In the linking view 701 of FIG. 7, the symbol table is located in a separate section 705. The symbol has the following attributes:

st_name: The symbol's name is the name used to reference it in the assembly language source for the object file. st_name holds an index into the object file's symbol string table, which holds the character representations of the symbol names.

st_value: For bitstream symbols, provides the offset of the bitstream within the section.

st_size: Size in bits of the bitstream.

st_info: Specifies type and binding attributes. A new type is employed, denoted as STT_BITSTREAM. This new type is specific to the present invention and signifies that this symbol is an FPGA bitstream. Binding determines linkage visibility and behavior and can be STB_LOCAL or STB_GLOBAL. STB_LOCAL indicates that the symbol is not visible outside the object file containing the symbol's definition. STB_GLOBAL indicates that the symbol is visible to all object files being combined. For bitstream symbols, binding may be either STB_LOCAL or STB_GLOBAL. Since bitstreams are usually used by more than one code section, and may therefore be compiled into a library for reuse, STB_GLOBAL is more likely to be used.

Relocations. Relocation is the process of connecting symbolic references with symbolic definitions. Relocatable files contain relocations, which are data describing where specific symbolic definitions may be found so that the linker may locate them. Specific relocation operations vary from ISA to ISA, just as with standard ELF files. Relocation types are contained within r_info fields of GARP_ELF_REL and GARP_ELF_RELA structures. Examples of such relocation types include:

GARP_ADDR: addresses determined at assembly time.

GARP_OFFSET: Relative address offsets from current Next Instruction Pointer Address Register (NIPAR) location to a symbol, typically a label.

Therefore, in accordance with the invention as claimed herein, the above-described Garp ELF object file format makes novel use of software linking technology to encapsulate computer programs along with the hardware configuration on which the program runs, using a partially reconfigurable computer 100 as described above. The system and method of the present invention can perform compilation for multiple configurations within a single source file, and in one embodiment is capable of encapsulating machine instructions and data along with hardware configurations required to execute the machine instructions.

While the present invention has been described with reference to certain preferred embodiments, those skilled in the art will recognize that various modifications may be provided. Variations upon and modifications to the preferred embodiments are provided for by the present invention, which is limited only by the following claims.

What is claimed is:

1. A compiling method for generating a sequence of program instructions for use in a partially reconfigurable processing unit, a portion of the processing unit having a hardware organization that is selectively reconfigurable during execution of the sequence of program instructions among a plurality of configurations, and a portion of the processing unit having a non-reconfigurable hardware organization, each configuration comprising a computational unit optimized for performing a class of computations, the compiling method comprising the steps of:

a) accepting as input a source file containing a plurality of source code instruction statements including at least a first subset of instruction statements and a second subset of instruction statements;

b) identifying a first configuration of the selectively reconfigurable portion of the processing unit to be used in executing the first subset of instruction statements, by retrieving a reconfiguration directive from the source file, the reconfiguration directive specifying the first configuration;

c) identifying a second configuration of the selectively reconfigurable portion of the processing unit to be used in executing the second subset of instruction statements, by retrieving a reconfiguration directive from the source file, the reconfiguration directive specifying the second configuration; and compiling the first subset of instruction statements for execution using the first configuration and compiling the second subset of instruction statements for execution using the second configuration.

2. The method of claim 1, wherein each reconfiguration directive is provided using a meta-syntax.

3. The method of claim 1, wherein each reconfiguration directive comprises one of an immediate reconfiguration directive, a function-level reconfiguration directive, and a default reconfiguration directive.

4. The method of claim 1, further comprising the step of:

e) generating an executable file including the results of d) and further including, for each subset of instruction statements, a reconfiguration code identifying the configuration corresponding to the subset of instruction statements.

5. The method of claim 1, further comprising the step of:

e) generating an executable file including the results of d) and further including, for each subset of instruction statements, a reference designating a bitstream representing the hardware configuration to be used in executing the subset of instruction statements.

6. The method of claim 1, further comprising the step of:

e) generating an executable file including the results of d) and further including, for each subset of instruction statements, a reference encoded according to an extended executable and linking format, the reference designating a bitstream representing the hardware configuration to be used in executing the subset of instruction statements.

7. The method of claim 1, further comprising the step of:

e) generating an executable file including the results of d) and further including, for each subset of instruction statements, a bitstream representing the hardware configuration to be used in executing the subset of instruction statements.

8. The method of claim 1, further comprising the steps of:

e) generating a first object file including the results of d) and further including, for each subset of instruction statements, a reconfiguration code identifying the hardware configuration to be used in executing the subset of instruction statements;

f) repeating a) through e) for at least a second source file to generate at least a second object file; and g) linking the object files generated in e) and f) to generate an executable file.

9. The method of claim 8, further comprising the step of:

h) performing memory alignment on the generated executable file according to alignment requirements.

10. The method of claim 9, wherein the generated executable file is associated with a bitstream representing a configuration, and wherein step h) further comprises:

h.1) padding the bitstream to perform memory alignment.

11. The method of claim 8, wherein:

step a) comprises accepting as input a source file containing a plurality of source code instruction statements including at least a first subset of instruction statements and a second subset of instruction statements, wherein at least one of the instruction statements contains an external reference; and step e) comprises generating a first object file including the results of d) and further including, for each subset of instruction statements, a reconfiguration code identifying the hardware configuration to be used in executing the subset of instruction statements, wherein at least one of the instruction statements contains an external reference;

and further comprising the step of:

f. 1) prior to g), resolving the external references of each object file.

12. The method of claim 1, wherein the first subset of instruction statements comprises a first defined function and the second subset of instruction statements comprises a second defined function.

13. The method of claim 1, wherein the first subset of instruction statements comprises a first arbitrary block of statements and the second subset of instruction statements comprises a second arbitrary block of statements.

14. The method of claim 13, wherein the source file includes at least one function call and function return, and wherein steps b) and c) each comprise selectively performing inter-procedural analysis to identify at each function call and function return an in-context configuration within the selectively reconfigurable portion of the processing unit.

15. A compiling method for generating a sequence of program instructions for use in a partially reconfigurable processing unit, a portion of the processing unit having a hardware organization that is selectively reconfigurable during execution of the sequence of program instructions among a plurality of configurations, and a portion of the processing unit having a non-reconfigurable hardware organization, each configuration comprising a computational unit optimized for performing a class of computations, the compiling method comprising:
  a) selecting a source code instruction statement from a source file containing a plurality of source code instruction statements;
  b) responsive to the statement comprising a function call, performing the steps of:
    b.1) determining a first configuration currently in context within the selectively reconfigurable portion of the processing unit;
    b.2) determining a second configuration for the function call;
    b.3) responsive to the first configuration being different than the second configuration, emitting a reconfiguration statement;
    b.4) emitting a compiled code statement for the function call;
  c) responsive to the statement not comprising a function call, emitting a compiled code statement for the statement; and
  d) repeating a) through c) for each source code instruction statement in the source file.

16. The method of claim 15, wherein b.4) comprises:
  b.4.1) emitting a compiled code statement for reading a return value from the selectively reconfigurable portion of the processing unit; and
  b.4.2) emitting a compiled code statement for the function call.

17. The method of claim 15, wherein the code statements comprise register transfer level statements.

18. The method of claim 17, further comprising:
  e) for each register transfer level statement:
    e.1) responsive to the register transfer statement being a reconfiguration statement, emitting assembly code for reconfiguring the selectively reconfigurable portion of the processing unit to a configuration specified by the reconfiguration statement;
    e.2) responsive to the register transfer level statement not being a reconfiguration statement, determining whether the statement may be executed by the selectively reconfigurable portion of the processing unit using a configuration currently in context;
    e.3) responsive to a determination that the statement may be executed by the selectively reconfigurable portion of the processing unit using the in-context configuration, performing the steps of:
      e.3.1) emitting assembly code for copying data into the selectively reconfigurable portion of the processing unit;
      e.3.2) emitting assembly code for starting execution of the selectively reconfigurable portion of the processing unit; and
      e.3.3) emitting assembly code for reading a return value from the selectively reconfigurable portion of the processing unit;
    e.4) responsive to a determination that the statement may not be executed by the selectively reconfigurable portion of the processing unit using the in-context configuration, performing the steps of:
      e.4.1) determining whether a translation rule exists for the register transfer level statement; and
      e.4.2) responsive to a determination that a translation rule exists, emitting assembly code for the register transfer level statement according to the translation rule.

19. The method of claim 18, wherein e.2) comprises the steps of:
  e.2.1) creating a first data flow graph describing a register transfer level tree;
  e.2.2.) creating a second data flow graph describing the in-context configuration of the selectively reconfigurable portion of the processing unit; and
  e.2.1.) determining whether the first data flow graph matches the second data flow graph.

20. The method of claim 18, wherein e.3.2) comprises generating code for setting a counter within the selectively reconfigurable portion of the processing unit to a nonzero value.

21. A compiling system for generating a sequence of program instructions for use in a partially reconfigurable processing unit, a portion of the processing unit having a hardware organization that is selectively reconfigurable during execution of the sequence of program instructions among a plurality of configurations, and a portion of the processing unit having a non-reconfigurable hardware organization, each configuration comprising a computational unit optimized for performing a class of computations, the compiling method comprising:
  an input device for inputting at least one source file containing a plurality of source code instruction statements, including at least a first subset of instruction statements, a second subset of instruction statements, and, for each subset of instruction statements, a reconfiguration directive specifying a configuration for the selectively reconfigurable portion of the processing unit; and
  a compiler, coupled to receive each source file from the input device, for compiling each input source file to produce an object file by identifying the configuration corresponding to each reconfiguration directive, compiling at least a portion of the input source file for execution using each configuration, and generating a reconfiguration code corresponding to each reconfiguration directive.

22. The compiling system of claim 21, further comprising:
  a linker, coupled to receive each object file, for combining the object files to generate an executable file containing, for each reconfiguration directive, a reference to a bitstream describing the hardware organization of the selectively reconfigurable portion of the processing unit and a sequence of program instructions to be executed using the described hardware organization.

23. The compiling system of claim 21, further comprising:
  a linker, coupled to receive each object file, for combining the object files to generate an executable file containing, for each reconfiguration directive, a bitstream describing the hardware organization of the selectively reconfigurable portion of the processing unit and a sequence of program instructions to be executed using the described hardware organization.

24. A computer program product comprising a computer-usable medium having computer-readable code embodied therein for generating a sequence of program instructions for use in a partially reconfigurable processing unit, comprising:
  computer-readable program code devices configured to accept as input a source file containing a plurality of source code instruction statements including at least a first subset of instruction statements and a second subset of instruction statements;

computer-readable program code devices configured to identify a first configuration of the selectively reconfigurable portion of the processing unit to be used in executing the first subset of instruction statements;

computer-readable program code devices configured to identify a second configuration of the selectively reconfigurable portion of the processing unit to be used in executing the second subset of instruction statements; and computer-readable program code devices configured to compile the first subset of instruction statements for execution using the first configuration and compiling the second subset of instruction statements for execution using the second configuration.

25. The computer program product of claim 24, further comprising:

computer-readable program code devices configured generate an executable file containing, for each reconfiguration directive, a reference to a bitstream describing the hardware organization of the selectively reconfigurable portion of the processing unit and a sequence of program instructions to be executed by the described hardware organization.

26. The computer program product of claim 24, further comprising:

computer-readable program code devices configured to generate an executable file including the compiled statements and further including, for each subset of instruction statements, a reference designating a bitstream representing a configuration of the selectively reconfigurable portion of the processing unit.

27. The computer program product of claim 24, further comprising:

computer-readable program code devices configured to generate an executable file including the compiled statements and further including, for each subset of instruction statements, a reference encoded according to an extended executable and linking format, the reference designating a bitstream representing a configuration of the selectively reconfigurable portion of the processing unit to be used in executing the subset of instruction statements.

28. The computer program product of claim 24, further comprising:

computer-readable program code devices configured to generate an executable file including the compiled statements and further including, for each subset of instruction statements, a bitstream representing a configuration of the selectively reconfigurable portion of the processing unit to be used in executing the subset of instruction statements.

29. The computer program product of claim 24, further comprising:

computer-readable program code devices configured to generate a first object file including the compiled statements and further including, for each subset of instruction statements, a reconfiguration code identifying the configuration to be used in executing the subset of instruction statements;

computer-readable program code devices configured to generate at least a second object file; and computer-readable program code devices configured to link the generated object files to generate an executable file.

30. The computer program product of claim 29, further comprising:

computer-readable program code devices configured to perform memory alignment on the generated executable file according to alignment requirements.

* * * * *